ELECTRIC ADJUSTING MEANS FOR AZIMUTH AND ELEVATION ADJUSTMENT

Original Filed June 11, 1969 4 Sheets-Sheet 1

ELECTRIC ADJUSTING MEANS FOR AZIMUTH AND E EVATION ADJUSTMENT

Original Filed June 11, 1969 4 Sheets-Sheet 1

ELECTRIC ADJUSTING MEANS FOR AZIMUTH AND ELEVATION ADJUSTMENT

Original Filed June 11, 1969 4 Sheets-Sheet 3

ELECTRIC ADJUSTING MEANS FOR AZIMUTH AND ELEVATION ADJUSTMENT

Original Filed June 11, 1969 4 Sheets-Sheet 4

United States Patent Office

Re. 27,653
Reissued May 29, 1973

27,653

ELECTRIC ADJUSTING MEANS FOR AZIMUTH AND ELEVATION ADJUSTMENT

Aane Adriaan Oskam, De Meern, Netherlands, assignor to Technische Industrie A. C. Koot N.V., Montfoort, Netherlands Original No. 3,552,836, dated Jan. 5, 1971, Ser. No. 833,890, June 11, 1969, which is a continuation-in-part of Ser. No. 701,353, Jan. 29, 1968. Application for reissue June 18, 1971, Ser. No. 154,549
Int. Cl. G02b *17/00*
U.S. Cl. 350—289 14 Claims

Matter enclosed in heavy brackets [ ] appears in the original patent but forms no part of this reissue specification; matter printed in italics indicates the additions made by reissue.

ABSTRACT OF THE DISCLOSURE

An adjusting means for azimuth and elevation adjustment comprising a hollow support and a universal joint connected to the support and to the part to be adjusted. A reversible electric motor is mounted in the support having a shaft, a reduction gear and an electro-magnetically controlled coupling. Planetary transmission [means] *systems* are provided [and means] whereby the shaft may optionally be coupled with each of said transmission [means] *systems* by a reduction gear and [an] *the* electro-magnetically controlled coupling. The transmission [means] *systems* are capable of acting on the universal joint to [bring about a rotation around] *effect rotational adjustment relative to* two different axes.

This application is a continuation-in-part of my application Ser. No. 701,353, filed Jan. 29, 1968, abandoned, entitled Electric Adjusting Means for Azimuth and Elevation Adjustment.

This invention relates to an electric adjustment means for azimuth and elevation adjustment.

The adjusting means for the invention is more specially designed for a rear view mirror to be mounted on a motor vehicle, said mirror being adapted to be adjusted to any desired position from the driver's seat. Said adjusting means, however, can also be used for the remote adjustment of a mirror for other purposes, directional lamp, aerial or other source of radiation or for a directing means.

Motor car mirrors are known, the position of which may be mechanically adjusted on a vertical and a horizontal axis by means of a cable which at one end is provided with hand operated driving means, whereas the other end is connected to parts located in the mirror support and being capable of translating the movements of the cable into the desired rotation of the mirror around two mutually perpendicular axes.

The disadvantage of mirrors of this kind is that, when the mirror is mounted on a fender, the cable connection on the inside of the fender often requires much space and is easily soiled, whereas the length of the cable has to be adapted to the dimensions of the vehicle. In practice it has been found that this leads to difficulties and considerable installing expenses.

An object of the invention is to provide an adjustment means wherein all mechanical parts are located in the fixed supporting parts of the mirror or the like, whereas the connection with the remote controlling parts is formed by an electric cable with three or four leads. Installing such a mirror is as simple as with an ordinary one.

The adjusting means of the invention is characterized by a hollow mounting support connected to the part to be adjusted through a universal joint, by a reversible electric motor mounted on said support, the shaft of which may be optionally coupled with one of two transmission parts by means of a reduction gear and an electro-magnetically controlled coupling, said transmission parts being capable of acting on the joint so as to bring about a rotation around two difference axes such as either around an axis coaxial with or parallel to the axis of the support, or around an axis substantially perpendicular to former axis.

In particular this coupling may be designed as a clutch cam which, without relative rotation, is slidable in longitudinal direction of the motor shaft and adapted to be alternately put into engagement with two coaxial pinions for coupling the latter to the shaft, said pinions driving the universal joint by means of considerably reductive planetary transmissions, the electromagnet being coaxially positioned with respect to the motor and acting on an armature cooperating with the cam and resiliently urged into one of its coupling positions, which magnet may bring said armature into its other coupling position.

Preferably both planetary transmissions are coaxially arranged in two planes perpendicular to the motor axis.

Both pinions act as the sun wheel of the corresponding planetary transmission, engage one part of a number of double stepped planet wheels disposed around the circumference of the sun wheel, the number of teeth in both parts of the planet wheels being slightly different.

Each of both these parts of the planet wheels is in engagement with a toothed rim, so that in driving the pinion the planet wheels are rolled off around one rim whereas the other is driven at a very slow speed with respect to the first one. For the azimuth drive one rim of one planetary transmission is fixedly connected to the mounting support, whereas the other is connected to a casing which may rotate the universal joint around the axis of the support.

This casing is provided with a second toothed rim which forms part of the second planetary transmission, the second toothed rim of which is rotatable with respect to this casing and is provided with a dog or pin which may describe a circular orbit around the axis of the support. which dog or pin engages with a guide in the universal joint, said guide extending in a plane through the axis of rotation which is substantially perpendicular to the axis of the support, and according to which axis the universal joints is coupled with the casing.

This universal joint may comprise a dome shaped hood to which the element to be adjusted may be fixed parallel to the aforesaid axis of rotation, which hood at least partially surrounds the planetary transmission and the casing.

In the case of a rear view mirror, this mirror may be connected to the universal joint by means of a friction coupling in order to protect this joint and the transmission parts against impact loads.

A further object is to provide an adjusting means wherein the universal joint comprises a coupling part which is rotatable around a fixed axis and is provided with a fork which is in engagement with a cam, said cam being adapted to be driven by one of the transmission parts, the element to be adjusted being pivotally connected to said coupling part around an axis perpendicular to the fixed axis, and being coupled to the other transmission part by means of a connecting rod, which is connected to said eleemnt in a point beyond said pivoting axis.

More specifically, the cam is connected to the first toothed rim and the connecting bar is coupled with the pin of the second toothed rim.

It is also possible to make both planetary transmissions symmetrically with respect to a plane perpendicular to their common axis, said transmissions driving the cam and a drive shaft connected to the connecting rod respectively.

Moreover it is preferred that the fixed axis and the pivoting axis interest each other substantially in one point.

In the case of a rear view mirror for a motor vehicle with a hood encompassing said mirror, the plane through the outer rim of the hood is disposed at a small distance before the point of intersection of the axes.

[In a preferred embodiment each of said transmission means comprises a pulley, a first and a second string being laid loosely in a loop around said first and second pulley respectively, the extremities of said strings each being fixed in two opposite points of said mirror, the line connecting the fixing points of said first claim being perpendicular to the line connecting the fixing points of the said second string, and guiding means for guiding said strings from said pulleys towards the respective fixing points of said mirror.

A further object of the invention is to provide strings attached to the mirror by spring means for providing a tension force in the strings. The springs are mounted in tubular parts at the rear side of the mirror.

A further object of the invention is to provide compression springs seated against the shoulder portions of the tubular parts with the strings each extending through a corresponding spring.]

Finally the invention provides an electric switch for an adjustment means according to the invention, which switch is designed in such a manner, that by moving elements thereof by means of the fingertips in two mutually perpendicular directions corresponding adjustments of the part to be adjusted may be effected.

The invention will be explained in detail by reference to the drawing, in which.

Figure 3:
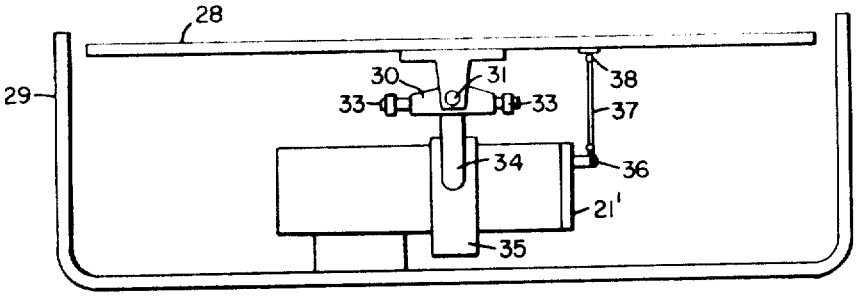
FIG. 3 is a cross-section of a motor-car mirror in a fixed hood with drive means adapted thereto.
Figure 6:
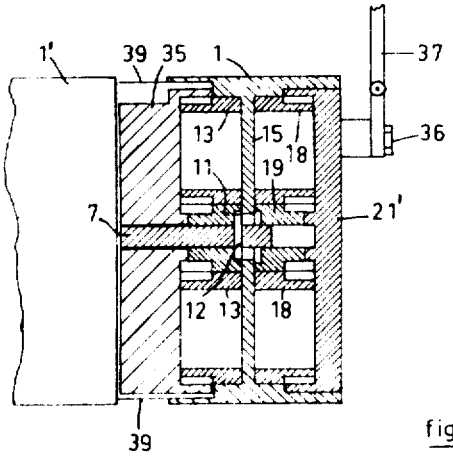
FIG. 6 is a preferred embodiment of the adjusting means for the mirror of FIG. 3; *and*

[FIGS. 8 and 9 are a perspective view and a side view respectively of a modified embodiment of the assembly according to FIGS. 3 and 6; and FIG. 10 is a rear view of a modification of the mirror according to FIGS. 8 and 9.]

Figure 1:
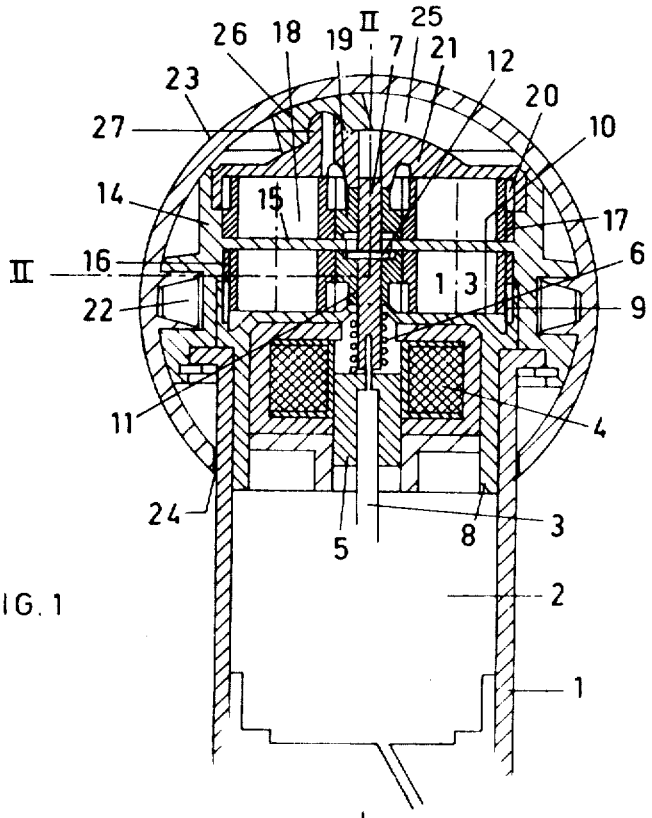
FIG. 1 shows an axial section through an adjusting means according to the invention.
Figure 2:
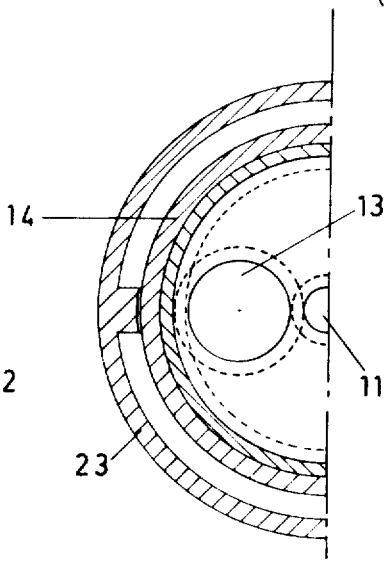
FIG. 2 is a section along the line II—II of FIG. 1.

The embodiment shown in FIG. 1 comprises a fixed support 1, which may be vertically positioned. Inside this support an electric motor 2 is disposed, the shaft 3 of which is coaxial with the support 1. On top of this motor 2 a magnet coil 4 is provided, inside which an armature 5 is slidable around the shaft 3, which armature is urged downwardly by a spring 6, and is connected to an output shaft 7, the latter being slidable in axial direction, but being non-rotatably coupled with the shaft 3.

A first casing 8 is arranged around the magnet coil 4, which casing is connected to the support 1. This casing is provided with an inner toothed rim 9 and a bottom wall 10. A first sun wheel 11, disposed above this bottom wall, is freely rotating on the shaft 7, but is coupled to this shaft by a dog or catch 12 as the armature 5 is in its lowest position.

Surrounding this sun wheel 11 at least two planet wheels 13 rest upon the bottom 10, said wheels being provided with two superposed sets of teeth with slightly different numbers of teeth. The lowermost set of teeth is in engagement with the toothed rim 9, whereas one or both, and generally the upper one, is in engagement with the sun wheel 11.

On top of the casing 8 a second casing 14 is mounted, which surrounds the first one and is rotatable with respect to it. The interior of this second casing is divided in two portions by a partition 15. This partition is supported upon the sun wheel 11 and the planet wheels 13. Below the partition 15 said casing is provided with a toothed rim 16 which is in engagement with the upper set of teeth of the planet wheels 13. Now, as the sun wheel 11 is driven, the planet wheels roll off along the toothed rim 9. Since the teeth engaging the rim 16 have a slightly different number of teeth, the rim 16, in consequence thereof, will be rotated with respect to the casing 14 at a speed and in a sense depending on the difference in the number of teeth. As a matter of fact the number of teeth and the diameter of the toothed rims 9 and 16 will correspondingly differ.

Over the bottom 15 the casing 14 is provided with an interior toothed rim 17, which is in engagement with double planet wheels 18 corresponding with the planet wheels 13. The planet wheels 18 engage with a second sun wheel 19, which bears on the partition 15 and is coupled with the shaft 7 as soon as the magnet coil 4 is energized. The second set of teeth of the planet wheels 18 engages with a toothed rim 20 of a disc 21 which rotatably fits into the casing 14, so that, in driving the sun wheel 19, said disc 21 is slowly rotated with respect to the casing 14.

The casing 14 is provided with two journals 22 the axis of which intersects the output shaft 7 perpendicularly. Surrounding these journals a spheroidal hollow hood 23 is rotatable, this hood being provided with a recess 24 through the support 1 extends inwardly. This hood surrounds the casing 14 and all other interior parts.

On its upper side the hood 23 is provided with a traverse guide 25 extending parallel to the axis of the journals 22. In this guide a sliding block 26 is located into which a rounded dog or catch pawl 27 on the upper surface of the disc 21, and disposed beyond its center, is fitted.

As the disc 21 rotates, the dog or catch pawl 27 describes a circular path. As a result of the connection of the hood with the journals 22, this cap cannot rotate, but may, however, be tilted around the journals for following this movement of the catch or dog 27. In this manner an elevation adjustment of an element connected with the hood 23 may be obtained, the angular extension of which depends on the location of the dog or pawl 27 and of the guide 25. As the casing 14 is rotated, the hood 23 is rotated too, so that an azimuth adjustment is obtained.

With the motor-car mirrors there is always the risk of passersby hitting the mirror and disturbing its adjustment. Since the gear ratio obtained with planetary transmission can amount to 3000:1 or more, and the internal friction may be rather large, this transmission is self-braking when the mirror is subjected to an impact. It may be useful, however, to connect the mirror to the cap 23 by means of a frictional connection in order to protect the transmission against impacts. This may also be obtained by using a casing 14 comprising two coaxial parts which are coupled by friction to one another.

Figure 1A:
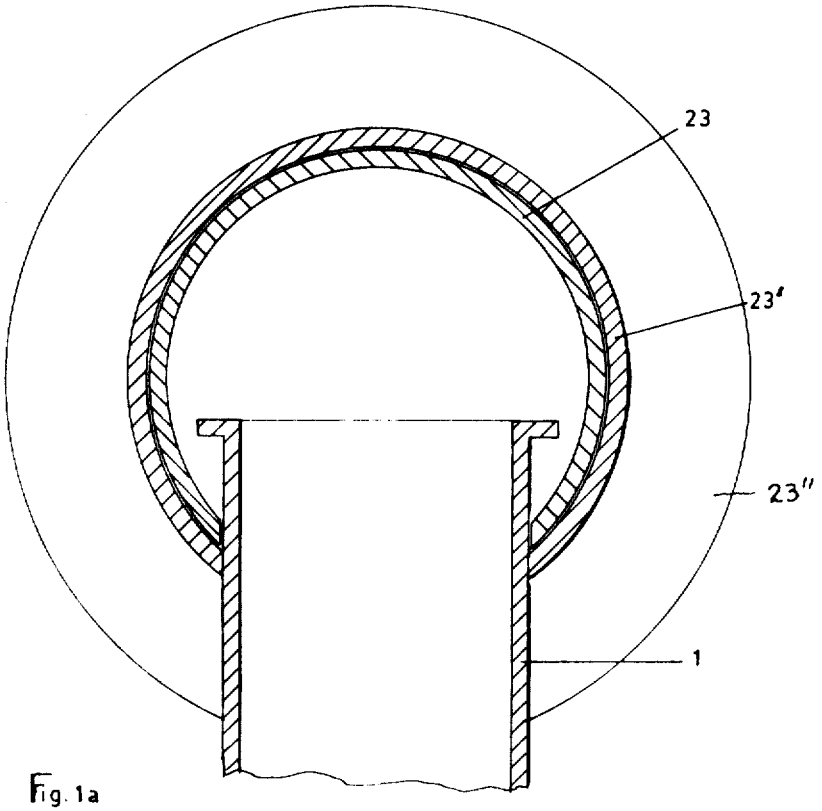
FIGS. 1a and 1b are partial illustrations of modifications, which omit the internal drive gearing, while emphasizing the modification portions.
Figure 1B:
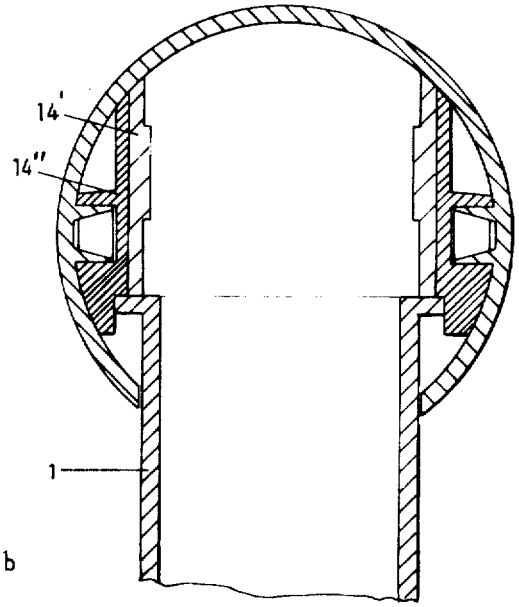

FIGS. 1a and 1b show such types of friction couplings. In FIG. 1a the hood 23 of FIG. 1 is surrounded by a second relatively movable spherical hood 23' to which the mirror or other part 23'' to be adjusted is connected. While a silght daylight clearance is shown between the parts 23 and 23', it is understood that this is a drawing exaggeration and that the normal friction between those hoods is sufficient for coupling the outer hood to the inner one, but, in case of impacts, the outer hood may arbitrarily rotate around the inner one. According to FIG. 1b the casing 14 of FIG. 1 is divided into two parts 14' and 14'' with a friction contact allowing a mutual coaxial relative rotation under impact loads.

FIG. 3 shows a motor-car mirror 28 enclosed in a fixed hood 29. If such a mirror should be made rotatable, and its axes of rotation are spaced too far from the front face of the mirror, the latter will hit the hood during rotation.

Figure 4:
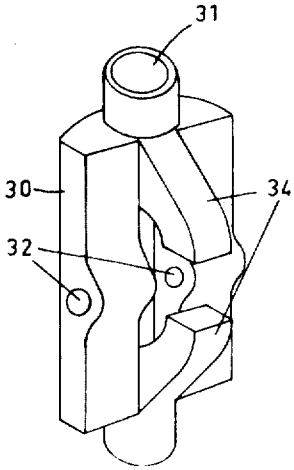
FIG. 4 is a coupling element for such a mirror.

In order to avoid this, the mirror 28 is hingedly connected to a coupling element 30 by means of rotation pins 31, shown in FIG. 4. Furthermore, this coupling is provided with mutually aligned apertures 32, the axes of which are perpendicular to the axis of the pins 31. Pins supported in bearings 33 extend into these apertures 32, said bearings being fixedly connected to the hood 29.

Figure 5:
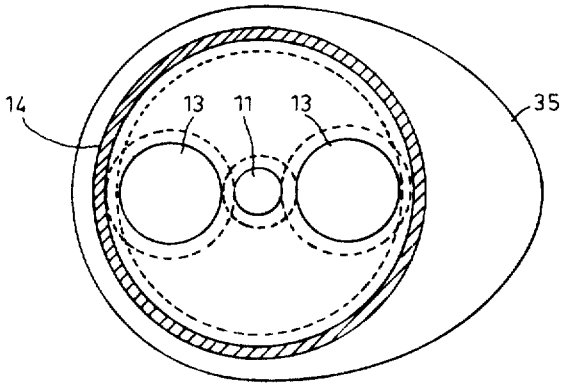
FIG. 5 is a cross-section corresponding to FIG. 2 of the adjusting means for the mirror of FIG. 3.

Furthermore, the coupling element 30 possesses two protrusions 34 forming a fork lying in a plane through the pins 31 and perpendicularly to the axis of the apertures 32. The fork coacts with a cam 35, which, as shown in FIG. 5, is fixed to the second casing 14 of the driving assembly shown in FIG. 1, which assembly then no longer comprises the outer hood 23. The disc 21' of this assembly is modified in that the catch 27 has been replaced by a crank pin 36 to which a coupling rod 37 is connected, which on the other hand, is hingedly fixed at 38 to the mirror 28.

In rotating the cam 35, the fork 34 follows around the axis of rotation 33, so that the mirror 28 rotates around the same axis. As the disc 21' is rotated, the crank pin 36 drives the rod 37 so that the mirror is rotated around the axis of the pins 31. Preferably these mutually perpendicular axes of rotation intersect each other, their point of intersection being positioned only slightly behind the plane through the outer rims of the hood 29, so that the rotating mirror will not contact this hood.

FIG. 6 shows a preferred embodiment of the planetary gear system, which is fully symmetrical, so that this system may be manufactured in a simpler way. This system is enclosed in a fixed casing 1' which, at the location of the cam 35, is provided with one or more apertures 39, into which the ends of the fork 34 fit. This gear system has, essentially the same structure as the system of FIG. 1, and its elements have been indicated by the same reference numbers. Therefore it is not necessary to give a detailed description of this system.

All casings and gears can be moulded from a plastic material. The supports 1 and 1' and the hoods 23 or 29 may be made from metal and/or plastic material. In a view of the large gear ratio, a very weak motor may be used, which preferably should be reversible by changing the polarity of the feeding lines. For the clutch control an additioned connection having one or two leads is sufficient.

Figure 7:
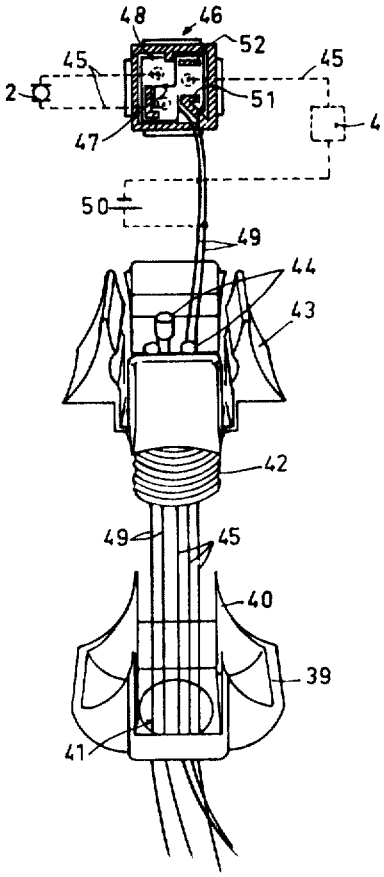
FIG. 7 is an exploded view of a switch for controlling the drive means of a mirror according to the invention, in which the electrical connections are schematically shown.

FIG. 7 shows a switch specially designed for a mirror according to the invention. This switch comprises a bottom part 39 with four extensions 40 and a central hole 41. In this hole fits a threaded stud 42 with a central bore, which stud may be fixed in a suitable location of the instrument panel of a car by means of a nut. Four lugs 43 are resiliently connected with said stud 42, which stud and lugs preferably form a unit made from a suitable plastic. In this unit three contact pins 44 are embedded, which are each connected to a separate lead 45.

In the space between the lugs 43 and the extensions 40 (the latter fitting between these lugs) a cap 46 is resiliently clamped, which cap is provided with two contact strips 47 and 48, each being connected to another lead 49. In FIG. 7 the position of the pins 44 in respect to these strips is indicated with phantom lines.

By gripping two opposed lugs 43 between two fingers, the cap 46 may be moved in two perpendicular directions. The leads 49 are connected to a source of direct current 50, and the motor 2 and the magnet coil 4 are connected to the pins 44 as indicated by dash lines.

When moving the cap 46 upward or downward as seen in FIG. 7, the motor 2 may be connected to the battery leads 49 in either one of the polarities thereof by contacting the corresponding pins 44 with either one of the strips 47 and 48, in order to energize this motor in the corresponding sense. The third pin 44 is, then, insulated from the contact strips 47 and 48 insulating strips 51 and 52. When moving the cap to the left or right, the same motor connections will be made, but, at the same time, the magnet 4 will be energized by contacting the third pin 44 with the strip 47. In this manner the mirror may be adjusted in two perpendicular directions and in the proper sense by movements of the finger tips which adequately correspond with the desired adjustment.

The adjusting means described has the advantage that all parts of it may be positioned in a small space. Especially the operative portions of the sun wheels 11 and 19 are adjacent to the partition 15, so that the stroke of the coupling cam 12 may be short. Although a simple reducing transmission is also possible wherein the change-over takes place at the slowly rotating side, the specified change-over at the fast side should be preferred, since, then, the coupling cam 12 can engage very quickly.

FIGS. 8, 9 and 10 show a preferred embodiment of the complete mirror assembly comprising the planetary gear system of FIG. 6, but using means for driving the mirror differing from those according to FIGS. 3 and 6.

In FIG. 8 the motor 2 is coupled to a double planetary gear according to FIG. 6, having a first end disc 21 and a second end disc 35', the latter corresponding to the cam 35 to FIG. 6. Both ends are provided with a pulley 51 and 52 respectively, around which strings 53 and 54 respectively are laid in a double loop, which strings are not fixed to said pulleys.

Motor 2 and support 1 of the planetary gear, as well as the magnet coil 4, which is in this case a separate unit, are mounted in a frame 55.

String 53 is, at one side, directed perpendicularly to said frame 55 and through an opening of a tubular rim part of the mirror 28, in which part said string is fixed by means of a helical spring 57 as indicated in phantom lines.

At the other side string 53 is guided towards the opposite side of said frame by means of guiding rolls 58, 59, 60 and 61 rotatably mounted on frame 55, and then directed towards the mirror, at which side the end of said frame is fixed to the mirror in a corresponding tubular rim part 56' as indicated in FIG. 9.

String 54 is directed at both sides towards the mirror by means of guiding rolls 62 and 63 rotatably mounted on frame 55, and is fixed at both ends in tubular rim parts, only one of which is indicated at 64, by means of springs, one of which is shown in phantom lines at 65.

The armature of magnet coil 4 is coupled by means of a fork 66 to the motor shaft 7, in order to engage the coupling dog with one of the sun wheels 11 or 19 as desired.

The mirror is coupled to frame 55 by means of a ball joint 67 or the like, so that a universal movement of said mirror is possible.

In operation, one of the discs 21 or 35' is driven by the motor 2, dependent on whether the magnet coil 4 is energized or not. When disc 21 is rotated in one sense, string 53, which is kept tensioned by the spring 57, is accordingly wound up at one side and wound off at the other side as a result of the friction with the pulley 51, so that the mirror will be tilted in a corresponding sense around an axis perpendicular to the motor axis.

When, on the other hand, disc 35' is rotated, string 54 will be wound up at one side and wound off at the other side, so that the mirror is tilted around an axis parallel to the motor axis.

As soon as the end of the allowed stroke of the mirror is reached, the pulleys 51 or 52, as the case may be, may rotate freely because of the friction with said strings, and the strings loops will slip along the surface of the respective pulleys. This is an important improvement in respect of the system of FIGS. 3 and 6, in which, when the disc 21 or the cam 35 have rotated over half a revolution, the movement of the mirror is reversed, so that the given position of the switch according to FIG. 7 is no longer adequately related to the sense of movement. In the embodiment of FIGS. 8 and 9, however, no reversal of the movement can take place without reversing the sense of rotation of the motor 2. Another advantage is that the mechanism will not be damaged when the mirror is moved by hand or is subjected to other external forces, since, then, the strings will also slip along the pulleys.

FIG. 10 shows a plan view of the real side of the mirror according to FIGS. 8 and 9, but with a different arrangement of the tubular parts 56 and 64, which, now are symmetrically arranged in the form of a lozenge.

The strings 57 and 65 are preferably compressing strings, as shown, seated near the opening of the corresponding tubular part, and each string is fixed at the free end of the corresponding spring, so that no hooks or other attaching means are needed, which simplifies the mounting of said springs in the tubular parts. It is also possible to attach one end of each spring directly to the mirror, since in many cases one spring is sufficient for tensioning each string.]

It will be obvious that the invention can be applied in all such cases where an adjustment means with remote control and of very restricted dimensions is required, e.g., in directing means optical instruments, observation or control apparatus for radioactive spaces and the like.

I claim:

1. An adjusting means for azimuth and elevation adjustment of a part to be adjusted comprising a hollow support, a universal joint connected to said support and to the part to be adjusted, one single reversible electric motor mounted in said support having a shaft, two planetary transmission means each having a sun pinion wheel and planet wheels meshing with said sun wheel, the sun wheels of said planetary transmission means being disposed coaxially with said motor axis, an electromagnetically controlled coupling whereby said shaft may optionally be coupled with one of said two pinion sun wheels by said electro-magnetically controlled coupling, said transmission means being capable of acting on said universal joint to bring about a rotation around two different axes.

2. An adjusting means according to claim 1, wherein said coupling comprises a clutch dog slidable in longitudinal direction of said shaft without relative rotation and adapted to be alternately put into engagement with said sun pinions.

3. An adjusting means according to claim 2 wherein said coupling comprises a magnet coil coaxially positioned with respect to said motor and an armature for said coil cooperating with said dog resiliently urged into one of its coupling positions and brought into its other position by said coil.

4. An adjusting means according to claim 1 wherein the gear ratio of said planetary transmission means is made considerably greater by providing in each transmission means, a number of said stepped planet wheels each having two parts of slightly different diameters, and disposed around the circumference of the corresponding sun wheel, each of both parts of said planet wheels being in engagement with a toothed rim, one of said rims being fixed in respect of the planet drive in question, the other being connected to an element for effecting the azimuth and elevation adjustment respectively, and one of said parts meshing with the corresponding sun wheel.

5. An adjusting means according to claim 4, further comprising driving output elements for the azimuth and elevation adjustment respectively, the former including a cylindrical casing coaxial with the motor axis, and the latter including a disc rotatable with respect to and coaxial with said casing, said disc having a pin describing a circular orbit around the axis of said casing, each of said driving output elements formng a part of a corresponding planetary transmission means.

6. An adjusting means according to claim 5, wherein said universal joint comprises a dome-shaped hood to which the element to be adjusted is fixed parallel to an axis of rotation of said hood which is substantially perpendicular to the axis of said support, said hood partially surrounding the planetary transmission and being connected to said casing by means of two journals coaxial with said axis of rotation, said pin operatively engaging a guide in said hood in order to rotate said hood around said axis on rotation of said pin.

7. An adjusting means according to claim 1 wherein said part to be adjusted comprising a rear view mirrow for a motor vehicle is connected to said universal joint by means of a friction couple.

8. An adjusting means according to claim 1 wherein said universal joint comprises a coupling part rotatable around a fixed axis having a fork lying in a plane substantially perpendicular to said axis in engagement with a cam, said cam being driven by one of said transmission means so that the element to be adjusted may be pivotally connected to said coupling part around an axis perpendicular to the fixed axis, and being coupled to the other transmission means by means of a connectng rod, which is connected to said element at a point beyond said pivoting axis.

9. An adjusting means according to claim 8 wherein said cam is connected to a first toothed rim, and said connecting rod is coupled with a pin on a second toothed rim.

10. An adjusting means according to claim 8 wherein said planetary transmissions are symmetrical with respect to a plane perpendicular to their common axis, said transmission means driving the cam and a pin connected to said connecting rod respectively.

11. An adjusting means according to claim 10 wherein the fixed axis and the pivoting axis intersect each other substantially in one point.

12. An adjusting means according to claim 11 further comprising wall means defining a hood having one open side, which hood is adapted to non-engagingly enclose the part to be adjusted and also affixed to said hollow support, a plane through the outer rim of said walls defining said hood being disposed at a small distance before the point of intersection of the axes so that the part to be adjusted will not strike said hood during its adjustment.

13. An adjusting means according to claim 1 comprising an electric switch comprising a base in which three non-aligned contact-pins are embedded, a cap overlying said pins having two contact strips connected to a DC current source, two of said pins being connected to corresponding terminals of the motor, and the third one being connected to one terminal of the magnet coil of the magnetical coupling, the other terminal being connected to one pole of the current source, said cap being movable into mutually perpendicular directions from a neutral position, said strips when moving the cap in one sense in either direction, one of the pins connected to the motor is contacted with the first strip and the other pin with the second strip, said connections being reversed as the cap is moved in the opposite sense, in order to connect the motor with the current source with the appropriate polarity for obtaining its rotation in the corresponding sense, and the third pin is contacted with one of the strips only when the cap is moved in one of said directions in order to energize the magnet coil, and remains insulated when the cap is moved in the other direction.

[14. An adjusting means according to claim 1, wherein each one of said transmission means comprises a pulley, a first and a second string being laid loosely in a loop around said first and second pulley respectively, the extremities of said strings each being fixed in two opposite points of said part to be adjusted, the line connecting the fixing points of said first string being substantially perpendicular to the line connecting the fixing points of the said second string, and guiding means for guiding said strings from said pulleys towards the respective fixing points of said mirror.]

[15. An adjusting means according to claim 14, wherein the strings are attached to said part to be adjusted by spring means providing tensioning force in said strings.]

[16. An adjusting means according to claim 15, wherein said springs are mounted in tubular parts to the rear side of said part to be adjusted.]

[17. An adjusting means according to claim 16, wherein said springs are compression springs seated against shoulder portions of said tubular parts, said strings each extending through a corresponding spring and being attached to the free end thereof.]

[18. An adjusting means according to claim 17, further comprising wall means defining a hood having one open side, which hood is adapted to non-engagingly enclose the part to be adjusted and also affixed to said hollow support, a plane through the outer rim of said walls defining said hood being disposed at a small distance before said universal joint between the hood and the mirror, so that the part to be adjusted will not strike said hood during its adjustment.]

[19. An adjusting means according to claim 14, wherein said planetary transmissions are symmetrical with respect to a plane perpendicular to their common axis.]

20. A planetary gear system with a considerable speed reduction ratio, comprising a plurality of coaxially aligned central sun wheels on an input axis, and a set including a number of floating planet wheels disposed around and engaging the circumference of each of said sun wheels, and an internally toothed fixed ring gear meshing with one set of said floating planet wheels, wherein each of said planet wheels are stepped pinions having two portions each with a slightly different diameter, one portion meshing with said fixed ring gear and the other portion meshing with the internal teeth of a rotatable ring gear mounted coaxialy with said fixed ring gear, said rotatable ring gear forming the output element of the planetary system, said sun wheels meshing with only one portion of the respective stepped pinions, and an axially slidable coupling dog adapted to be alternatively engaged selectively with each of said sun wheels in order to couple the corresponding planetary gear with an input axis.

References Cited

The following references, cited by the Examiner, are of record in the patented file of this patent or the original patent.

UNITED STATES PATENTS

| | | | |
|---|---|---|---|
| 1,799,740 | 4/1931 | Felton | 74—801 |
| 3,008,375 | 11/1961 | Henderson | 350—289 |
| 3,027,807 | 4/1962 | Barcus et al. | 350—289 |
| 3,064,536 | 11/1962 | Weingartner | 350—289 |
| 3,164,915 | 1/1965 | Benner et al. | 74—801 X |
| 3,453,906 | 7/1969 | Ito | 74—801 |

RONALD L. WIBERT, Primary Examiner

M. J. TOKAR, Assistant Examiner

U.S. Cl. X.R.

74—801